United States Patent
Lawrence et al.

(10) Patent No.: US 8,270,591 B2
(45) Date of Patent: Sep. 18, 2012

(54) MULTI-MEDIA CONTACT CHANNEL IN AGENT STATE CONTROL SYSTEM AND METHOD FOR USE IN A CONTACT CENTER

(75) Inventors: Christopher Stanley Lawrence, Worcester, MA (US); Nancy Hegarty, Nashua, NH (US)

(73) Assignee: Aspect Software, Inc., Chelmsford, MA (US)

( * ) Notice: Subject to any disclaimer, the term of this patent is extended or adjusted under 35 U.S.C. 154(b) by 1056 days.

(21) Appl. No.: 11/211,113

(22) Filed: Aug. 23, 2005

(65) Prior Publication Data

US 2007/0055777 A1      Mar. 8, 2007

(51) Int. Cl.
*H04M 3/00* (2006.01)

(52) U.S. Cl. .............................. 379/265.03; 379/265.12

(58) Field of Classification Search ............. 379/265.03, 379/266
See application file for complete search history.

(56) References Cited

U.S. PATENT DOCUMENTS

| | | | |
|---|---|---|---|
| 5,555,179 A | 9/1996 | Koyama | 700/95 |
| 5,765,033 A | 6/1998 | Miloslavsky | 709/206 |
| 5,926,539 A | 7/1999 | Shtivelman | 379/266.01 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| 6,002,760 A | 12/1999 | Gisby | 379/266.01 |
| 6,021,428 A | 2/2000 | Miloslavsky | 709/206 |
| 6,044,145 A | 3/2000 | Kelly et al. | 379/265.02 |
| 6,044,368 A | 3/2000 | Powers | 707/2 |
| 6,067,357 A | 5/2000 | Kishinsky et al. | 379/265.02 |
| 6,108,711 A | 8/2000 | Beck et al. | 709/242 |
| 6,138,139 A | 10/2000 | Beck et al. | 709/202 |
| 6,167,395 A | 12/2000 | Beck et al. | 707/3 |
| 6,170,011 B1 | 1/2001 | Macleod Beck et al. | 709/224 |
| 6,175,563 B1 | 1/2001 | Miloslavsky | 370/352 |
| 6,175,564 B1 | 1/2001 | Miloslavsky | 370/352 |
| 6,185,292 B1 | 2/2001 | Miloslavsky | 379/265.01 |
| 6,345,305 B1 | 2/2002 | Beck et al. | 709/242 |
| 6,373,836 B1 | 4/2002 | Deryugin et al. | 370/352 |
| 6,389,007 B1 | 5/2002 | Shenkman et al. | 370/352 |
| 6,393,015 B1 | 5/2002 | Shtivelman | 370/352 |
| 6,574,605 B1 * | 6/2003 | Sanders et al. | 705/8 |
| 6,732,156 B2 | 5/2004 | Miloslavsky | 709/206 |
| 6,775,378 B1 * | 8/2004 | Villena et al. | 379/266.07 |
| 6,782,093 B2 * | 8/2004 | Uckun | 379/266.06 |
| 7,406,515 B1 * | 7/2008 | Joyce et al. | 709/224 |
| 7,630,487 B2 * | 12/2009 | Shaffer et al. | 379/266.03 |

* cited by examiner

*Primary Examiner* — Curtis Kuntz
*Assistant Examiner* — Amal Zenati
(74) *Attorney, Agent, or Firm* — Bourque and Associates, PA

(57) ABSTRACT

A channel and agent state control system and method is used in a contact center having a plurality of multi-media contact channels and a plurality of agents for handling communications over the contact channels. The agents are allocated to one or more contact channel tasks corresponding to the contact channels. The system and method reallocates the agents between the contact channels based upon real-time contact channel state data and the agent states. The system and method can be configured by a user to determine when reallocation is needed within a contact channel and to determine how the agents are reallocated.

20 Claims, 3 Drawing Sheets

MULTI-MEDIA CONTACT CHANNEL IN AGENT STATE CONTROL SYSTEM AND METHOD FOR USE IN A CONTACT CENTER

TECHNICAL FIELD

The present invention relates to contact centers and more particularly, relates to a contact channel and agent state control system and method that control the allocation of agents between multiple contact channels in a contact center.

BACKGROUND INFORMATION

A growing number of companies have used call centers to handle interactions or communications between customers and potential customers by way of telephone. These call centers provide inbound services, for example, to handle queries from customers to customer service representatives (CSR) and outbound services for managing outbound telephone calls to potential customers for telemarketing and to existing customers for collections. Some call centers are also capable of providing blended inbound and outbound services. Call centers have recently expanded to include other types of communication such as e-mail and web chat, and are now commonly referred to as contact centers.

A typical contact center 10, FIG. 1, includes a number of different components. Communication systems 12 establish the communications over various contact channels. The communication systems 12 can include one or more e-mail/web servers 14 for establishing one or more e-mail contact channels and/or web communication channels. The communication systems 12 can also include a PBX/ACD 16 for establishing telephony channels.

Agent workstations 18 are used by agents to handle the communications over the contact channels, such as inbound and outbound telephone calls, e-mails, web communications, and any other form of communication supported by the contact center 10. Each of the agent workstations 18 includes a data terminal, such as a PC 20, for receiving and transmitting data and an audio communications device, such as a headset 22, for receiving and transmitting voice communications. A supervisor workstation 24 can be used by a supervisor or system administrator to oversee the agents and activities in the contact center 10.

A host system 26 stores information pertaining to the customer, potential customer, or other contacted party. The host system 26 typically includes one or more databases of customer or potential customer information, such as customer records, including customer name and telephone number, account information, and the like.

A contact center management system 28 monitors and manages the contact center activities, resources and overall performance. The contact center management system 28 may incorporate the Email/web server as well as the ACD/PBX or these items may be provided externally. The contact center management system 28 typically includes one or more servers, for example, implemented using a Windows 95/98 or NT operating system or a Unix based operating system, and including software for managing the contact center. One example of contact center management software is available from Davox Corporation under the name ENSEMBLE™. The components of the contact center 10 are typically interconnected using a local area network (LAN) 29, such as an ethernet.

In a typical contact center, the agents at the agent workstations 18 are assigned to contact channel tasks such that the agents will handle events that occur on a contact channel within the assigned task. Contact channel events typically include inbound calls, outbound calls, e-mails, and web chat sessions. The agent's state is the current working or operational activity being performed by an agent within a particular task. For example, an agent in a work inbound state is actively handling an inbound call event. An agent in an idle outbound state is an agent assigned to an outbound task but not currently handling an outbound call event. One function of the contact center management system 28 is to establish contact channel queues (not shown) for contact channel events that cannot be handled immediately by an agent.

Although the integration of multi-media contact channels in a single contact center expands the communication capabilities of the contact center, the effective management of traffic on the contact channels is important to a company's successful use of the contact center. Various factors can affect the productivity of the contact center, such as idle agents and a significant increase of activity on a certain contact channel. If there is a significant increase in the volume of inbound calls and a decrease in the volume of e-mails, for example, the customer service for the calls in the inbound hold queue will suffer while the agents currently assigned to the e-mail queue may be unproductive. Although some existing call centers have a call-blending feature, this feature is limited to inbound and outbound telephone channels and does not allow agent resources to be efficiently controlled across all contact channels.

Accordingly, a system and method is needed for controlling or managing the allocation of agents across all contact channels to maintain consistent customer service as well as consistent agent productivity.

SUMMARY OF THE INVENTION

In accordance with one aspect of the present invention, a multi-media contact channel and agent state control method is provided for use in a contact center having a plurality of multi-media contact channels and a plurality of agents for handling communications over the contact channels. Each of the agents is allocated to at least one contact channel task corresponding to the contact channels. According to the method, agent configuration data and contact channel configuration data is provided. Real-time contact channel state data is posted representing contact channel states of the multi-media contact channels. Based upon the real-time contact channel state, data is posted representing contact channel states of the multi-media contact channels. Based upon the real-time contact channel state data and the contact channel configuration data, the method determines that at least one of the contact channels needs a re-allocation of agent resources. The agents of the contact center are monitored to determine an agent state for each of the agents. The agent's state is an operational activity being performed by an agent within a contact channel task. At least one of the agents is then re-allocated based upon the contact channel needing the re-allocation and based upon the agent state and the agent configuration data.

In accordance with another aspect of the present invention, a system is provided for controlling multi-media contact channel states and agent states in a contact center. The system comprises contact channel state data representing contact channel states, which are current operational activities being performed by the contact channels in the contact center. The system also comprises agent state data representing agent states, which are current operational activities being performed by agents in the contact center. The system also includes configuration data representing rules for allocating the agents to the contact channels. A load balancing engine monitors the contact channel states and the agent states and re-allocates the agents to the multi-media contact channels based upon the contact channel state data, the agent state data, and the configuration data.

In accordance with a further aspect of the present invention, a contact center is provided. The contact center comprises a plurality of agent workstations including data terminals and audio communications devices for use by agents, a host system including contact data, a communications systems for establishing contact channels allowing the agents to communicate, and a contact center management system for managing resources in the contact center. The contact center management system comprises contact channel state data representing contact channel states, agent state data representing agent states, configuration data representing rules for allocating the agents to the contact channels, and a load balancing engine for monitoring the contact channel states and the agent states, and for re-allocating the agents to the multi-media contact channels based upon the contact channel state data, the agent state data, and the configuration data. The components of the contact center are preferably interconnected using a network.

BRIEF DESCRIPTION OF THE DRAWINGS

These and other features and advantages of the present invention will be better understood by reading the following detailed description, taken together with the drawings wherein.

DETAILED DESCRIPTION

Figure 1:
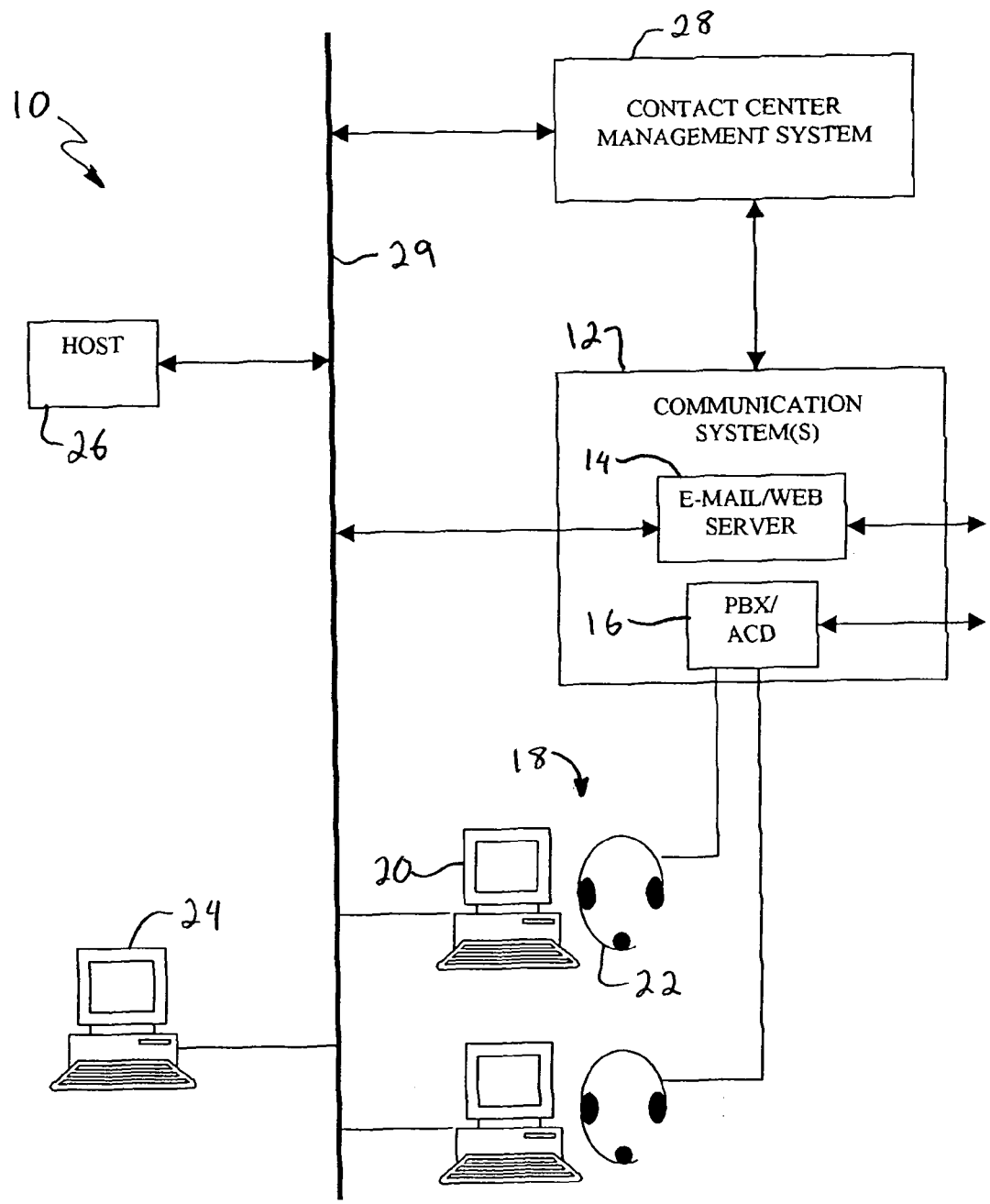
FIG. 1 is a schematic block diagram of a contact center, according to the prior art.
Figure 2:
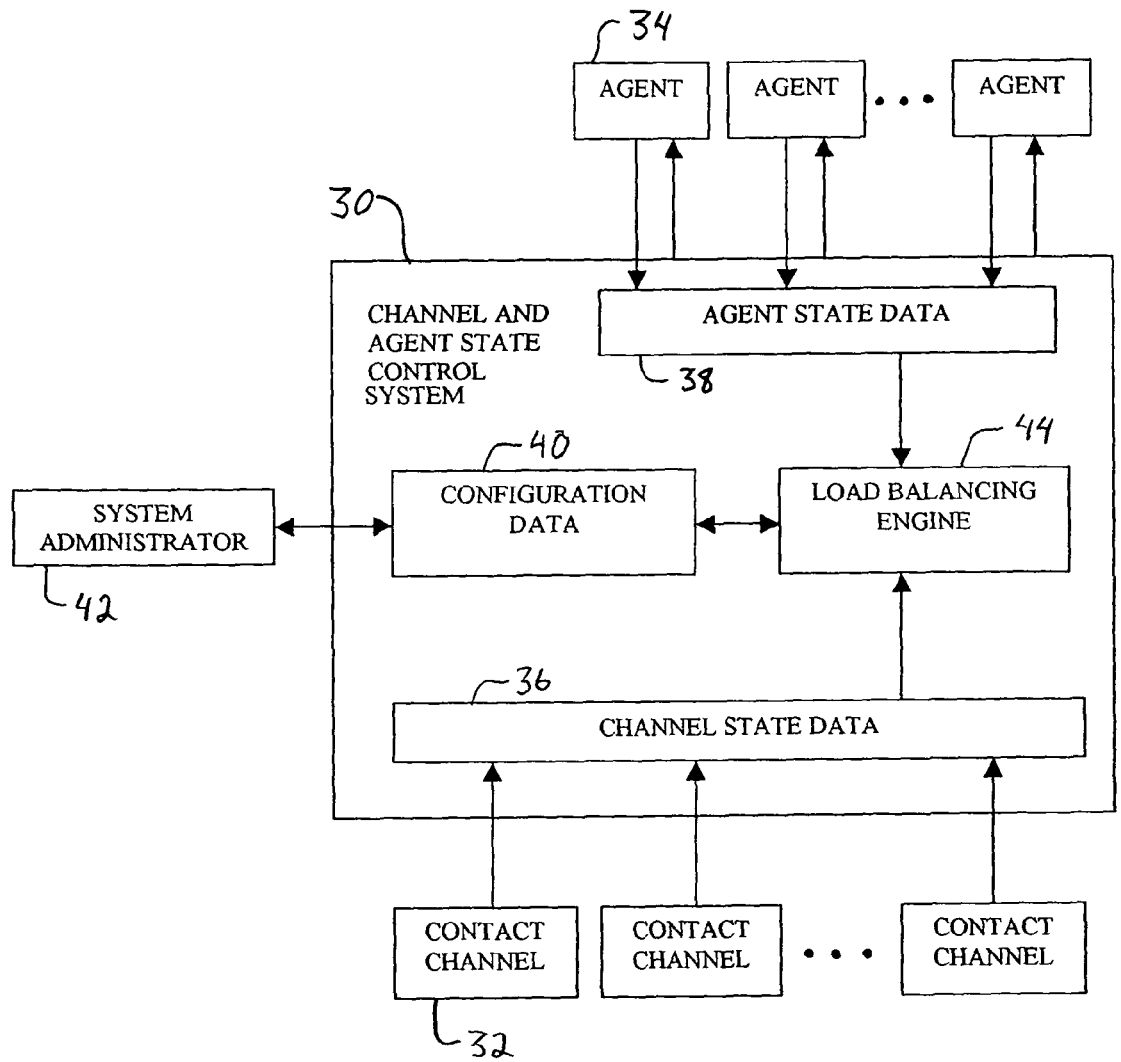
FIG. 2 is a schematic block diagram of a channel and agent state control system, according to the present invention.
Figure 3:
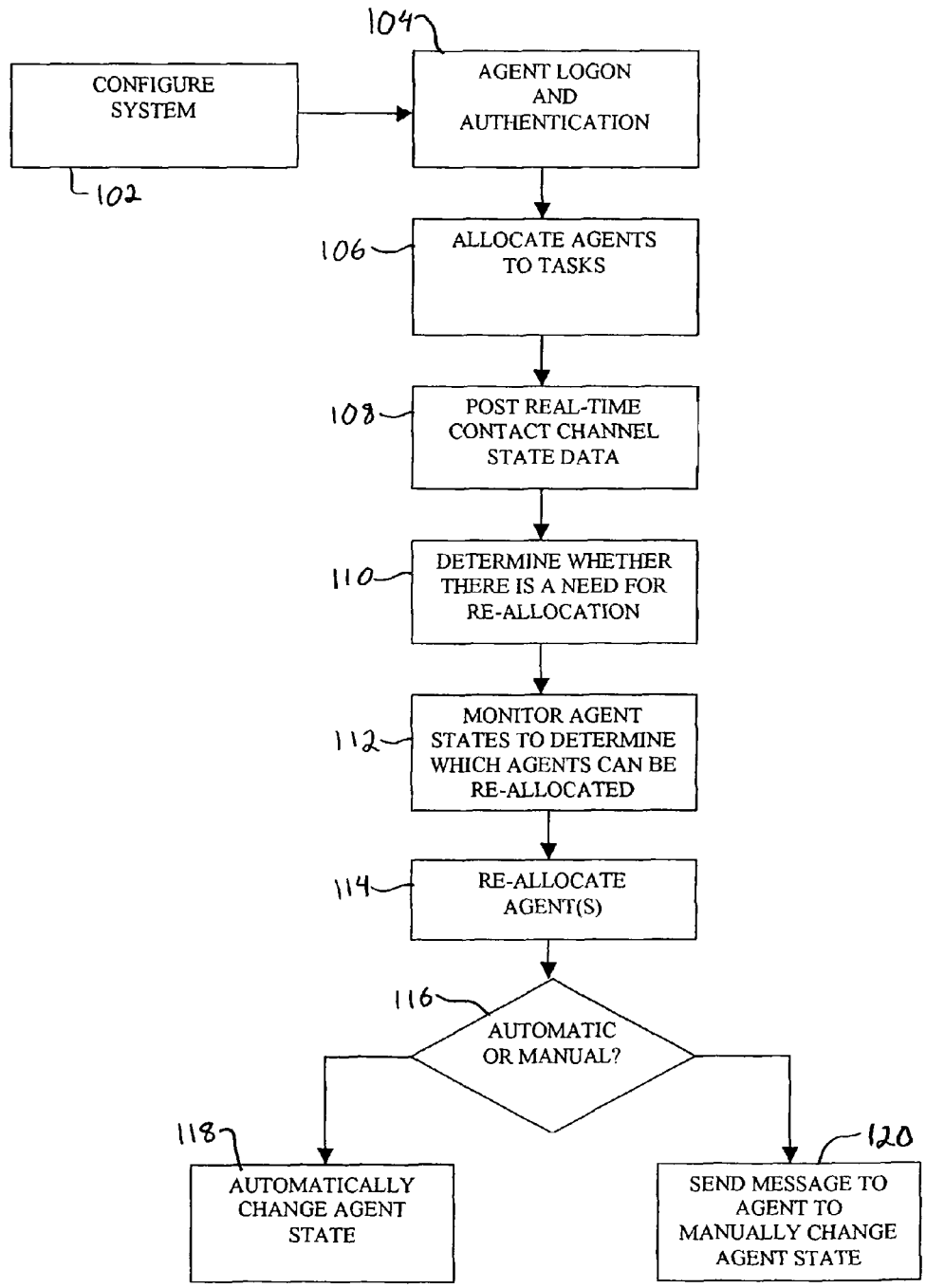
FIG. 3 is a flow chart illustrating a channel and agent state control method, according to the present invention.

A contact channel and agent state control system 30, FIG. 2, according to the present invention, is linked to the contact channels 32 and to the agents 34 and controls the allocation of the agents 34 between the contact channels 32. In one example, the channel and agent state control system 30 is incorporated into an existing contact center management system 28, such as the ENSEMBLE™ system manufactured by Davox or the EnsemblePro® system manufactured by Concerto Software®, using one or more servers and/or software modules. The channel and agent state control system 30 can also be used with other types of contact centers.

The channel and agent state control system 30 monitors the contact channels 32, which post real-time contact channel state data 36. The contact channels 34 include, but are not limited to, one or more inbound telephone channels, one or more outbound telephone channels, one or more e-mail channels, one or more web communication channels (e.g., web chat, web contact, web collaboration), one or more voice over IP channels, and one or more wireless channels. The contact channels 34 are organized according to tasks to which agents are assigned. Telephony tasks include outbound telephony, inbound telephony, and blend telephony (both inbound and outbound). On-line tasks include e-mail, chat, voice over IP, wireless, and on-line blend (more than one on-line task).

The contact channel state data 36 preferably pertains to the state or current working or operational activities of a specific contact channel queue or routing structure. The contact channel state data 36 can include, for example, the number of contact channel events in each of the contact channel queues; the number of agents actively working each of the contact channel queues; the service level of each of the contact channel queues; and the length of time for any event within each of the contact channel queues. The service level may be a relative percentage of performance within a specific contact queue. For example, a service level measure for inbound contact centers using the telephone as the contact channel may have a service level of 80 percent of inbound phone calls delivered to agents within 20 seconds of call arrival. Email contact channels may use a different service level, such as 100% of emails delivered within 1 day of email receipt. Web chat contact channels may use a service level of 90% of chat requests answered by agents within 1 minute of initial request. The length of time may refer to the absolute time a customer is retained within a queue without being serviced by either the system or an agent to completion. For example, a customer that calls into a contact center via the phone channel may spend 2 minutes on hold or waiting to speak to a live agent.

Additional service level data may include real time data of the total number of requests in the queue or the current number of agents that can complete the transaction. An example of this data may be the prompts status of a phone customer on hold reporting the total number of calls currently waiting to be serviced by agents as well as the caller's position in that queue.

The channel and agent state control system 30 also monitors agent states and controls allocation of the agents 34 to tasks associated with the contact channels 32. The agent state is the current working or operational activity being performed by an agent within a specific contact channel task. The agent states include an on-work state where the agent is currently working on an event within a contact channel task; an idle state where an agent is waiting for an event; an unavailable state where an agent is currently not available to receive any contact channel events, such as phone calls, emails, or web events; or an available state where an agent is ready and available to receive contact channel events.

Other examples of agent's state may include, for example, an interruptible state where an agent is currently in the process of working on a live contact channel event, such as an email or web chat, but can be delivered an additional contact channel event, such as, an additional email or web chat; this state allows agents to work multiple contact channel events simultaneously. Another example is an uninterruptible state where an agent is not able to work multiple, simultaneous contact channel events; the agents are only allowed to work a single contact channel event at a time. Another example of an agent's state may include an on-break state where the agent remains logged into the system, but is not accounted for within system queues and load balancing parameters. In the on-break state, agents are tracked for the amount of time they spend on break which equates to a different type of "unavailable" state whereby the agents cannot receive any contact channel events. Another example of an agent's state may include a busy state where the contact center system sees that an agent is logged into the system and may become an available system resource for load balancing once their state changes from busy to available or interruptible.

The agents 34 post agent state data 38 defining the agent states to the channel and agent state control system 30. Through the agent's interactions with the various contact center channels, the agents update their state information within the system. All agent state information is stored within the server.

The channel and agent state control system 30 includes configuration data 40 representing rules and parameters governing the management and control of the contact channel and agent states. A system administrator 42 preferably enters the configuration data 40, allowing the user to configure the contact channel and agent state control system 30 according to user preferences. One configuration option allows the user or system administrator 42 to determine whether the reallocation is automatically controlled by the system 30 or manually controlled by the agent, as will be described in greater detail below.

The configuration data 40 includes contact channel configuration data representing rules governing when a particular contact channel needs reallocation. One example of such contact channel configuration data is a volume threshold that results in a reallocation of agent resources if the number of events in a contact channel queue exceeds a predetermined number of events. The contact channel configuration data can also include thresholds for the number of agents actively working a contact channel queue, the service level of a queue, and the length of time for any event within a queue.

The configuration data 40 can also include agent configuration data representing rules governing whether or not an agent can be moved. The agent configuration data can prevent an agent having one particular state from being moved to another state. For example, the system can be configured such that an agent actively working an inbound call cannot be moved to an e-mail task while in the work state. The agent configuration data can also limit the tasks within which an agent can work. For example, the system can be configured such that agents can only be moved between the inbound and e-mail channels. Each agent can have their own configuration settings or share common settings by being placed within an agent group. Only those agents that retain the skill to be considered for reallocation will be used within the load balancing function. Agents can have one, or any combination of skills that correspond to each of the contact center channels. For example one agent may only be able to receive inbound and outbound phone calls and not be able to receive emails, while another agent may be able to receive all three of the above channel contacts and also have their email state defined as interruptible.

The channel and agent state control system 30 also includes a load balancing engine 44. The load balancing engine 44 applies the channel state data 36 and the agent state data 38 to the rules defined by the configuration data 40. Based on this data, the load balancing engine 44 determines if and how the agents should be reallocated to balance the load. The system 30 then reallocates the agents 34 accordingly.

According to the channel and agent state control method, the system administrator or other user configures the system, step 102. To begin working in the contact center, an agent logs on and is authenticated, step 104. The agents are preferably defined as having skills to handle certain contact channel tasks. According to one method, the agent can be presented with a list of all available tasks for which that agent is skilled, allowing the agent to choose the tasks in which the agent wants to work. When an agent is initially defined, the agent is assigned a number of various skills and skill levels. Skills correspond to the various contact center channels. According to another method, an agent can automatically be assigned to all tasks for which the agent is skilled simultaneously. By assigning an agent to all assigned tasks (i.e., queues) simultaneously, the agents possess the ability to move between tasks without the need to log into and out of various tasks. The tasks or queues are preferably presented to each agent in a menu format on the display of the agent workstation.

Initially, each of the agents is allocated to a primary task, step 106, and the agents begin handling events within this assigned primary task. As the agents handle events for each of the contact channel tasks, the real-time contact channel state data is posted, step 108. Based upon the real-time contact channel state data, the method determines if one or more contact channels needs a reallocation of agent resources, step 110. For example, the method determines if the real-time contact channel state data has exceeded any of the predetermined thresholds defined by the configuration data.

The method also monitors agent states to determine which agents can be reallocated, step 112. For example, the method applies the agent state data representing the agent's current state to the rules defined by the configuration data to determine if the agent can be reallocated to the contact channel having a need for reallocation. Agent profile data, such as agent skills, etc., are defined as part of the agent profile within the system database. When an agent logs into a system, the system registers the agent and reads the agent profile into its memory. This allows the system to quickly find agents whose skills match those that are required by the various contact center channels.

Based upon the agent states and the contact channel states, the method reallocates the agents, step 114. The manner in which the agents are actually moved depends upon how the system is configured, step 116. If the system has been configured for an automatic change of the agent state, the system automatically changes the agent state, step 118. According to one example of automatically changing the agent state, the system 30 moves an agent to a state within another task using push technology.

For example, if an agent is currently working on an email request and an inbound phone call arrives within the contact center, the system will search first for agents that are available that possess the inbound phone skill as their primary skill. If no agents are readily available, the system will then look for an agent that possesses the inbound phone skill but that is currently in a busy state on a task that has been defined as interruptible. In this case, the agent working the email has their profile set to allow interrupts for emails, and they also possess the inbound phone skill. The system will then suspend the email event and change or push the agent into an available state for the inbound phone call. The agent will then go into a busy state once they receive the inbound phone event. If the system has been configured for a manual change of the agent state, the system will send a message to the agent instructing the agent to manually change the agent state, step 120. According to one example of manually changing the agent state, the agent is presented with a tab on the agent's console such that the agent can click on the tab to begin handling that event.

According to one example of this method, an agent is assigned a primary task of inbound telephony but is also skilled to handle an e-mail task. If the volume of events in the e-mail queue exceeds a predetermined threshold and the agent is in the inbound idle state, the agent can be reallocated to the e-mail queue. If the service level for the inbound queue then breaks a parameter or rule, however, the system automatically identifies the agent as having a primary task of inbound and determines the agent's current agent state. If the system finds that the agent with the primary task equal to inbound, but whose current agent state is something other than inbound (e.g., chat or e-mail), the system will automatically move that agent to the inbound available state. The system can also be configured to allow customers to manage their own states or to allow some applications to be automated and others to be agent controlled.

Accordingly, the system and method of the present invention receives real-time messages from various contact channels and impacts the performance of those contact channels by moving agents into and/or out of various operation states within those channels.

Modifications and substitutions by one of ordinary skill in the art are considered to be within the scope of the present invention, which is not to be limited except by the claims that follow.

The invention claimed is:

1. A multi-media contact channel and agent state control method for use in a contact center having a plurality of multi-media contact channels and a plurality of agents for handling communications over said multi-media contact channels, wherein each of said agents are assigned to at least one primary operational activity corresponding to said contact channels, said method comprising the acts of:

providing agent configuration data from the plurality of agents, said agent configuration data including an agent state indication, wherein said agent state indication represents a current operational activity being performed by said agent within a specific contact channel;

providing contact channel configuration data from each of the plurality of multi-media contact channels, wherein said contact channel configuration data is based upon a plurality of predetermined service levels that track a relative percentage of performance within a specific contact channel, wherein said predetermined service levels include a service level measure for each of said plurality of multi-media contact channels;

updating and reporting real-time contact channel state data of each of said plurality of multi-media contact channels representing contact channel states to determine if said contact channel state data has exceeded said predetermined service levels of each of said multi-media contact channels, wherein said contact channel configuration data is measured against rules governing when a particular multi-media contact channel needs reallocation;

determining, based upon said real-time contact channel state data, said agent configuration data and said contact channel configuration data, that at least one of said contact channels needs a re-allocation of agent resources;

continually and in real-time monitoring and assessing said agents in said contact center to determine said agent state representing said current operational activity for each of said agents;

re-allocating at least one of said agents based upon said at least one contact channel needing said re-allocation of agent resources and based upon said agent state representing said current operational activity of at least one of said agents and said agent configuration data, wherein said re-allocation of at least one of said agents involves identifying an agent with a current operational activity that does not match said agent's primary operational activity and wherein said agent has been assigned with said primary operational activity needed by said contact channel in need of re-allocation; and re-assigning said agent from said agent's current operational activity to said agent's primary operational activity.

2. The method of claim 1 wherein said multi-media contact channels include at least one of inbound telephone channels, outbound telephone channels, email channels, world-wide-web communication channels, and voice over IP channels.

3. The method of claim 1 wherein said agents are initially assigned to a primary operational activity and at least one secondary operational activity, wherein said agents are re-allocated to either their primary operational activity or their secondary operational activity when said at least one contact channel needing said re-allocation of agent resources requires agent resources in either said primary operational activity or said secondary operational activity.

4. The method of claim 1 wherein monitoring said agents in said contact center includes posting real-time agent state data representing said agent states.

5. The method of claim 4 wherein at least some of said agents are skilled for predetermined contact channel activities, and wherein monitoring said agents in said contact center further includes determining said contact channel activities for which said agents are skilled.

6. The method of claim 1 wherein re-allocating at least one of said agents includes automatically changing said agent state of said at least one of said agents to an agent state within said one of said multi-media contact channels.

7. The method of claim 6 wherein said agent state is automatically changed using push technology.

8. The method of claim 1 wherein allocating said agents includes posting a message to said one of said agents asking said one of said agents to manually change said agent state to an agent state within said one of said multi-media contact channels.

9. The method of claim 1 wherein said contact channel data posted for each of said contact channels includes at least one of: a number of events in a contact channel queue; a number of agents actively working on events in a contact channel queue; a service level of a contact channel queue; and a length of time for an event within a contact channel queue.

10. The method of claim 1 wherein said agent configuration data represents rules governing the allocation of said agents to said contact channels.

11. The method of claim 1 wherein said contact channel configuration data represents rules governing the capabilities of said contact channels.

12. A system for controlling multi-media contact channel states and agent states in a contact center having a plurality of multi-media contact channels and a plurality of agents for handling communications over said contact channels, wherein each of said agents are assigned to at least one primary operational activity corresponding to said contact channels, said system comprising:

contact channel state data representing contact channel states, wherein said contact channels states are current operational activities being performed by said contact channels in said contact center;

agent state data representing agent states, wherein said agent states of each of said agents features a current operational activity being performed by each of said agents in said contact center;

configuration data representing rules for allocating and reallocating said agents to said contact channels, wherein said rules for allocating and reallocating said agents includes reallocating at least one of said agents after identifying an agent with a current operational activity that does not match said agent's primary operational activity and that said agent has been assigned with a primary operational activity needed by said contact channel in need of reallocation; and a load balancing engine for monitoring said contact channel states and said agent states, and for re-allocating said agents to said multi-media contact channels based upon said contact channel state data, said agent state data, and said configuration data.

13. The system of claim 12 wherein said multi-media contact channels include at least one of inbound telephone channels, outbound telephone channels, email channels, worldwide-web communication channels, and voice over IP channels.

14. The system of claim 12 wherein said load balancing engine re-allocates said agents by automatically changing said agent states.

15. The system of claim 14 wherein said load balancing engine automatically changes said agent states using push technology.

16. The system of claim 12 wherein said load balancing engine re-allocates said agents by posting a message to said agents asking said agents to manually change said agent state.

17. The system of claim 12 wherein said contact channel data includes at least one of: a number of events in a contact channel queue; a number of agents actively working on events in a contact channel queue; a service level of a contact channel queue; and a length of time for an event within a contact channel queue.

18. The system of claim 12 wherein said configuration data includes contact channel configuration data representing rules governing the capabilities of said contact channels and agent configuration data represents rules governing the allocation of said agents to said contact channels.

19. A multi-media contact channel and agent state control system for use in a contact center having a plurality of multi-media contact channels and a plurality of agents for handling communications over said contact channels, wherein each of said agents are assigned to at least one primary operational activity corresponding to said contact channels, said system comprising:
    means for providing agent configuration data and contact channel configuration data;
    means for posting real-time contact channel state data representing contact channel states of said multi-media contact channels;
    means for monitoring and assessing continually and in real-time said agents in said contact center to determine agent states of each of said agents, said agent state representing a current operational activity of each of said agents;
    means for determining, based upon said real-time contact channel state data and said contact channel configuration data, that at least one of said contact channels needs a re-allocation of agent resources;
    means for monitoring agents in said contact center to determine an agent state for each of said agents, said agent state being a primary operational activity or a current operational activity being performed by an agent within a contact channel; and
    means for re-allocating at least one of said agents from said current operational activity to said primary operational activity based upon said at least one contact channel needing said re-allocation of agent resources and based upon said agent state of said one of said agents and said agent configuration data.

20. A contact center comprising:
a plurality of agent workstations including data terminals and audio communications devices;
a plurality of agents, wherein each agent is assigned a primary operational activity;
a host system including contact data;
communications systems for establishing contact channels allowing said agents to communicate; and
a contact center management system for managing resources in said contact center, said contact center management system comprising:
contact channel state data representing contact channel states, wherein said contact channels states are current operational activities being performed by said contact channels in said contact center;
agent state data representing agent states, wherein said agent states for each of said agents indicates a current operational activity being performed by said agents in said contact center;
configuration data representing rules for allocating said agents to said contact channels; and
a load balancing engine for monitoring said contact channel states and said agent states, and for re-allocating said agents to said multi-media contact channels based upon said contact channel state data, said agent state data, and said configuration data, wherein re-allocating of at least one agent includes identifying an agent with a current operational activity that is different from their primary operational activity wherein said agent has been assigned with said primary operational activity that is currently needed by said contact channel;
wherein said agent workstations, said host system, said communication systems, and said contact center management system are connected over a network.

* * * * *